US010410425B1

(12) United States Patent
Patel

(10) Patent No.: US 10,410,425 B1
(45) Date of Patent: Sep. 10, 2019

(54) PRESSURE-BASED OBJECT PLACEMENT FOR AUGMENTED REALITY APPLICATIONS

(71) Applicant: Amazon Technologies, Inc., Reno, NV (US)

(72) Inventor: Pratik Patel, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/792,980

(22) Filed: Oct. 25, 2017

(51) Int. Cl.
| | |
|---|---|
| *G06T 19/00* | (2011.01) |
| *G06F 3/0481* | (2013.01) |
| *G06T 15/10* | (2011.01) |
| *A63F 13/25* | (2014.01) |
| *A63F 13/30* | (2014.01) |
| *G06K 9/00* | (2006.01) |
| *G06F 3/0484* | (2013.01) |

(52) U.S. Cl.
CPC ............ *G06T 19/006* (2013.01); *A63F 13/25* (2014.09); *A63F 13/30* (2014.09); *G06F 3/04815* (2013.01); *G06T 15/10* (2013.01); *G06F 3/04842* (2013.01); *G06K 9/00671* (2013.01)

(58) Field of Classification Search
None
See application file for complete search history.

(56) References Cited

U.S. PATENT DOCUMENTS

| | | | | |
|---|---|---|---|---|
| 5,874,956 A | * | 2/1999 | LaHood | G06F 3/04815 715/854 |
| 2006/0181521 A1 | * | 8/2006 | Perreault | G06F 1/1613 345/173 |
| 2011/0179350 A1 | * | 7/2011 | Capela | G06F 17/211 715/244 |
| 2013/0307875 A1 | * | 11/2013 | Anderson | G06T 19/006 345/633 |

* cited by examiner

*Primary Examiner* — Frank S Chen
(74) *Attorney, Agent, or Firm* — Hogan Lovells US LLP

(57) ABSTRACT

The position of a virtual object in a scene, such as a scene of augmented reality (AR) content to be rendered, can be adjusted at least in part using pressure input. A user can apply varying amounts of pressure to a pressure sensor, for example, to control a distance between the virtual object and a virtual camera rendering a current view of the scene. An increase in pressure can increase the distance, or cause the object to move "away" from the user, while a decrease in pressure can decrease that distance, causing the virtual object to move "toward" the user. An acceleration function can be used to control the movement, to provide more accurate and user-friendly position control. Smoothing can be applied to the pressure data to reduce the presence of noise or jitter in the data. Other inputs can be used to control lateral movements or rotations.

19 Claims, 7 Drawing Sheets

PRESSURE-BASED OBJECT PLACEMENT FOR AUGMENTED REALITY APPLICATIONS

BACKGROUND

The widespread adoption of portable computing devices, such as smartphones and tablet computers, has resulted in a corresponding increase in the amount and types of electronic content available to players. This includes the providing of augmented reality (AR) content, where a device can capture video content of a location and a computing device can render content such that it appears, at least as displayed on a screen of the device, that the content exists in that location. As the computing device moves, the view of the content can change accordingly, being rendered as if the content corresponds to an actual three-dimensional object being captured by the camera of the device at the appropriate location and angle. The development of content, such as AR content, in a three-dimensional virtual space can be difficult using conventional tools and applications, particularly when it comes to accurately positioning objects in that space.

BRIEF DESCRIPTION OF THE DRAWINGS

Various embodiments in accordance with the present disclosure will be described with reference to the drawings, in which.

DETAILED DESCRIPTION

Figure 1A:
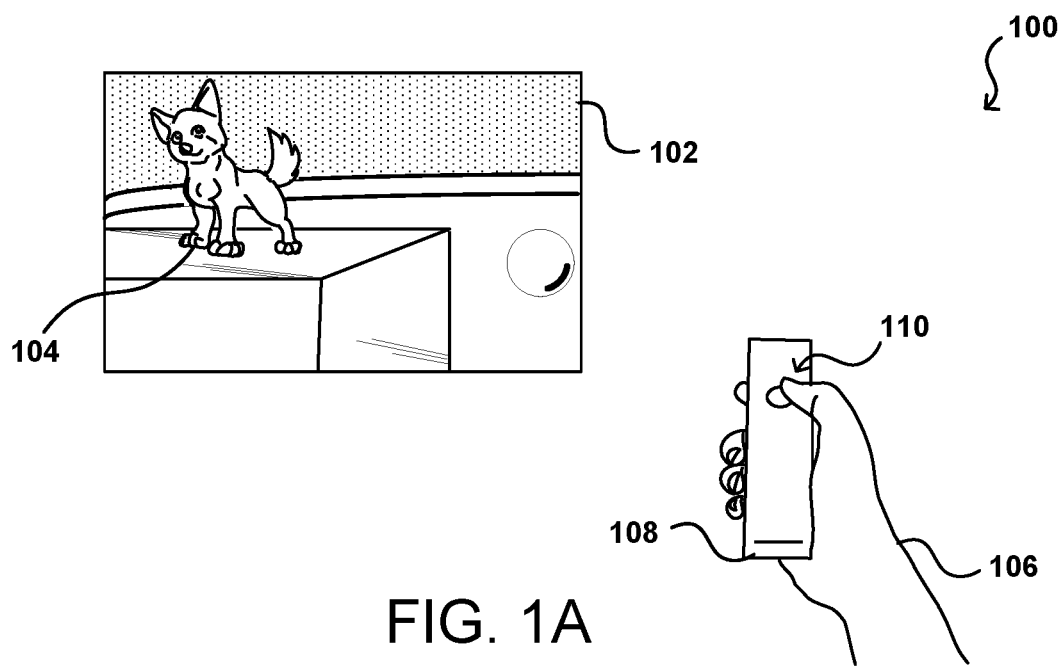
FIGS. 1A and 1B illustrate an example approach to positioning objects in an augmented reality environment that can be analyzed in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the generation of dynamically-rendered content, such as augmented reality (AR) content. In particular, various approaches enable the control of the position of a graphical object, such as an AR element or character, using pressure input. A user can apply varying amounts of pressure to a pressure sensor, for example, to control a distance between the virtual object and a virtual camera rendering a current view of the scene. An increase in pressure can increase the distance, or cause the object to appear to move "away" from the user, while a decrease in pressure can decrease that distance, causing the virtual object to appear to move "toward" the user in the scene. An acceleration function can be used to control the speed of movement, providing more accurate and user-friendly control. Smoothing can also be applied to the pressure data to reduce the presence of noise or jitter in the data. Other inputs can be used to control lateral movements or rotations, among other such options.

Various other functions can be implemented within the various embodiments as well as discussed and suggested elsewhere herein.

As mentioned, an increasing number of applications are being developed that provide an augmented reality (AR) experience, if not a full virtual reality (VR) experience. In a conventional augmented reality experience, a user is able to utilize a computing device (or computer-connected device) with a camera to capture and display a live view of an area around the user. An augmented reality application executing on the computing device can analyze at least a portion of the captured image data, as well as sensor data and the like, to determine information about the region around the user, such as the locations of various physical objects or surfaces. This information makes up the background of the "scene" in which augmented reality content is to be displayed. The AR application can utilize the scene information to location surfaces and/or locations at which it is appropriate to place virtual objects of the AR application. For example, the application might decide to place virtual animals at various nearby locations, such that when the user views the live camera feed through a display of the AR device, the view will display a rendering of the animals over the live camera feed such that it appears as if the virtual animals are located in that scene. As the user moves the AR device, the rendering of the animals will adjust as well such that it appears as if the animal is actually physically located at a particular location in the scene near the user. Thus, if a user pans to the right then the animal will appear to move to the left along with the other objects in the scene. Approaches for locating appropriate surfaces or locations for rendering AR content, as well as approaches for adjusting the rendered location based on movements of the device, are well known in the art and as such will not be discussed in detail herein.

When developing the AR application, an artist or developer will need to determine where to place the virtual objects. There can be some variation allowed based upon objects in the scene in some embodiments, such that the object does not appear to collide with a physical object but instead might be rendered to be on top or in front of the object, but the general locations of the objects can be determined and encoded into the application. The placement of objects is typically performed using an interface of an application development platform or system. In the interface, a view 102 of a portion of a scene of AR content can be displayed. The view can correspond to a point of view, and field of view, of a virtual camera. The position of the virtual camera in the scene can be fixed or allowed to be adjusted during development. A user can pan or rotate the scene in order to obtain different views from the location of the virtual camera. Thus, if the artist wants to move a virtual object, such as the virtual dog 104 illustrated in FIG. 1A, in a scene, the artist can adjust the view of the camera and cause the virtual object to move laterally along with the motion. Other object motions are possible as well, such as to rotate or resize the virtual object.

It might be the case, however, that the artist wants to adjust a distance between the virtual object 104 and a virtual camera from which the scene is rendered, where the rendered view corresponds to the point of view and field of view of the virtual camera. While AR tools are generally good with rotations and lateral translations, due to the nature of AR input, the tools are not as strong with distance, or longitudinal, adjustments. There are various input mechanisms, but these inputs do not provide for simple, fine-grained control over such object placement in a scene of AR content.

Accordingly, approaches in accordance with various embodiments can utilize an input mechanism such as a pressure sensor to provide for control over object positioning, and other aspects, in a virtual environment. In particular, various embodiments allow for the adjustment of longitudinal distance, or distance from a virtual camera, based at least in part upon pressure applied to a corresponding pressure sensor. For example, in the situation 100 illustrated in FIG. 1A, an input device 108 is being held in the hand 106 of a user, such as an artist or developer creating a scene of AR content. In this example, the user has a thumb placed proximate a pressure sensor 110 on the input device. In this example the user is not applying any pressure to the sensor, but in other embodiments the user might be applied a fixed amount of pressure to the sensor as corresponds to a particular distance, etc.

Figure 1B:
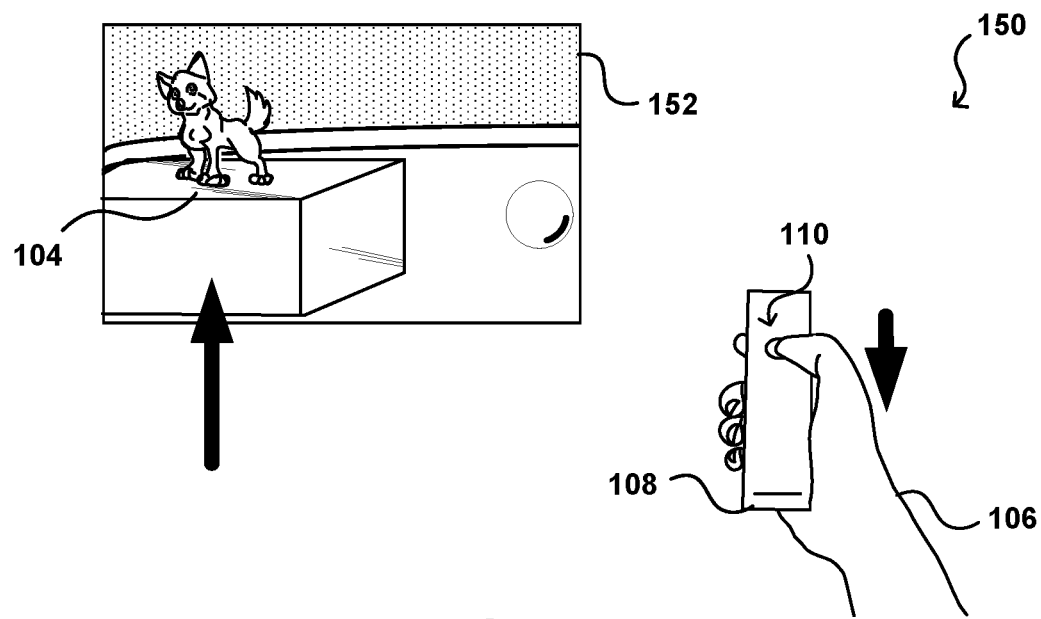

The user in this example is positioning a virtual object 104, here a dog on a box, in the scene of content. The virtual object 104 is shown at a position in the scene that is a determined distance from the virtual camera for the view, corresponding to a specific position in the scene. For augmented content, this would correspond to a physical location corresponding to the virtual location, at which the virtual object is to appear to be placed. If the user wants to shift the dog to the left or right in the scene, for example, and with respect to the virtual camera, the user can tilt or rotate an input mechanism, such as by using the neck or wrist of the user depending upon the type of input. For example, AR glasses might be rotated using the user's neck, while an input object 108 such as the type shown in FIG. 1A, can be rotated using the user's wrist, among other such options. It might be the case, however, that the user wants to push the virtual object 104 back in the scene, or pull the object closer to the virtual camera. While the lateral movement can be accomplished through the aforementioned rotations, such rotations do not provide for lateral movements. Accordingly, a user can utilize the pressure sensor 110 to control the distance and/or longitudinal positioning of the virtual object 104 in the scene. For example, the virtual object 104 is at a first distance in the view 102 of FIG. 1A. The user can apply pressure to the pressure sensor 110, as shown in the situation 150 of FIG. 1B, which can be detected by the appropriate computing device with which the artist is developing the content. The detected application, or increased application, of pressure can be used to indicate that the distance between the virtual object and the virtual camera should increased. In other words, pushing on the pressure sensor can cause the object to be similarly "pushed" back in the scene, with respect to the virtual camera. Thus, the position of the virtual object 104 in the view 152 of FIG. 1B is further from the virtual camera than in the view of FIG. 1B. Once the object is placed at the desired distance, the user can remove the pressure from the pressure sensor 110 in order to cause the virtual object to be positioned at that distance and location.

In some embodiments, the pressure applied will control the distance. An object might start near the camera, and increasing pressure will cause the object distance to be increased accordingly. In such a situation, a fully-depressed pressure sensor (or other maximum pressure metric) can cause the object to be placed at a far end of the scene, or maximum allowable distance from the virtual camera. Because pressure sensors do not always function linearly, or users are not always able to apply pressure in an even, linear fashion with respect to distance, the distance may not correlate exactly to the amount of pressure applied, but may be a function of the applied pressure, as discussed elsewhere herein, although increases in pressure will always correspond to increases in distance in these embodiments. In other embodiments, the application of pressure over time will cause the object to move to an increased distance, where consistent pressure will cause the object to move at a relatively consistent rate. Increases in pressure can be indications of a desire to move the object more quickly, thus corresponding to an acceleration of the movement. Thus, light applications of pressure in some embodiments will correspond to slow movements longitudinally, while heavier applications of pressure will result in faster movements, allowing for quick placements when needed and then fine tuning of position when appropriate. A reduction in pressure can result in a slowing of the movement backwards up to a certain pressure point, or threshold, beyond which lighter pressure can result in the object being brought back towards the virtual camera. In other embodiments a button or other input can cause the application to switch between forward and backward motion, such that increased pressure can still result in increased speed or acceleration.

Figure 2A:
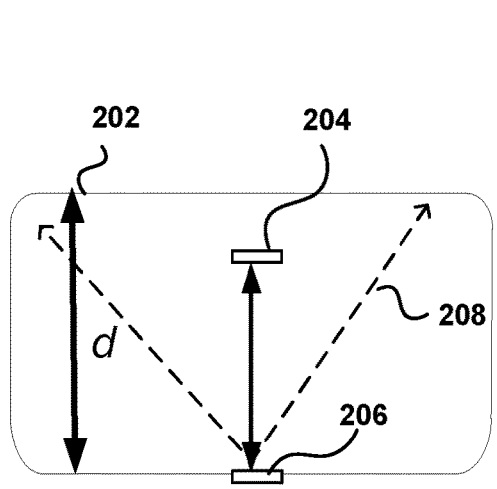
FIGS. 2A, 2B, 2C, and 2D illustrate example approaches to adjusting object position with changes in pressure detected by a pressure sensor that can be utilized in accordance with various embodiments.
Figure 2B:
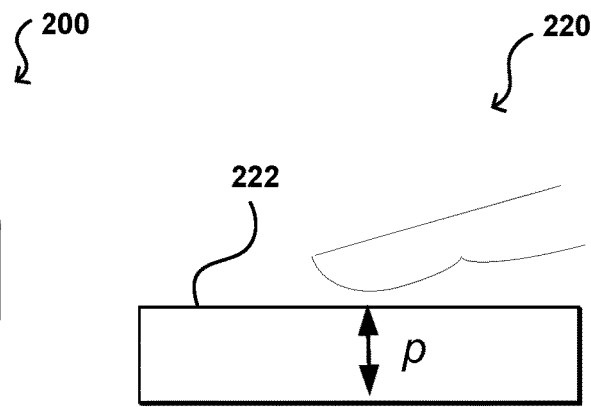

FIG. 2A illustrates another view of an example scene 200 that can be created as part of an AR environment in accordance with various embodiments. In this example, the bounds of a given scene are displayed as part of a rectangular playing field 202. The field 202 has a width, d, which also corresponds to a maximum distance an object can be placed from a virtual camera 206. The virtual camera 206, corresponding to a view of an AR application, has a corresponding field of view 208 for which objects will be rendered when contained within that field of view. The user can place a virtual object 204, such as a three-dimensional character object, at a particular location within the field 202. The virtual object 204 can be at a specific distance from the virtual camera 206. In some embodiments the user can apply pressure to a pressure sensor 222, such as illustrated in the example situation 220 of FIG. 2B, in order to cause the distance between the virtual object and the virtual camera 206 to be increased, up to the maximum available distance of d. If the user wants the virtual object 204 closer to the virtual camera, the user can decrease an amount of pressure applied to the pressure sensor 222 in some embodiments, in order to have the distance decreased down to a minimum distance of zero, where the virtual object is at the same location as the virtual camera. The units in this example are generally not important for understanding, but can be any appropriate units in various implementations, as may relate to meters or feet, among other such options. In some embodiments an input device might also have two input sensors, one for forward motion and one for backward motion, where the user can control the amount in each direction based upon the amount of pressure applied to either sensor.

Figure 2C:
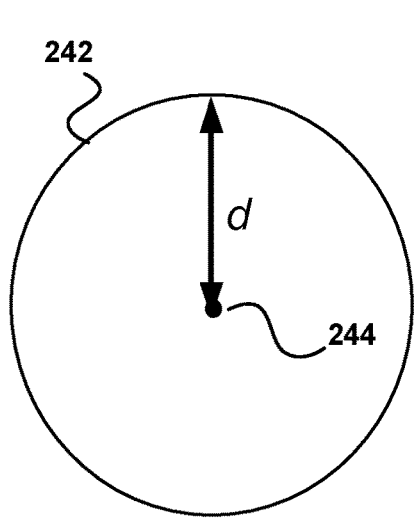

For AR applications, the positions of various objects will often be with respect to the position of the virtual camera, as that virtual camera can rotate 360 degrees about the position of the user. Thus, in some embodiments the distance from the virtual camera will enable the artist to position at a determined distance in any angle with respect to the user position 244, as illustrated in the circular field 242 for the scene 240 of FIG. 2C. In this situation, where the user might be wearing AR goggles for development, the distance will still be between zero and a determined maximum distance d, but d can be the same for any angle or can potentially differ with angle, as may be based upon the shape of the physical space in which the user or AR device is located.

Figure 2D:
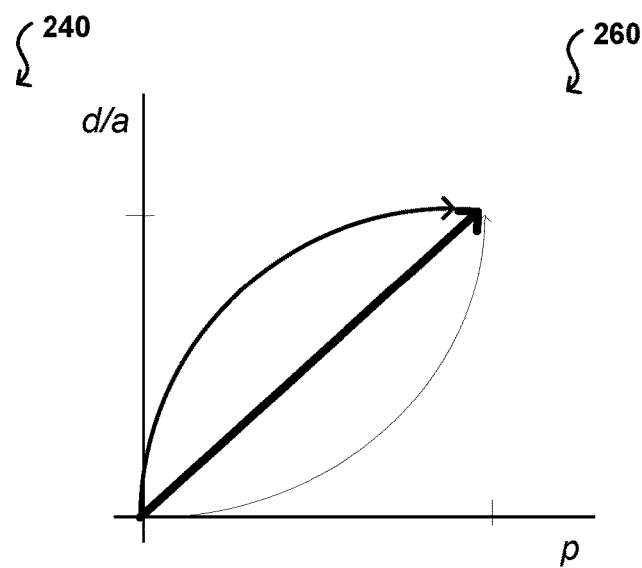

As mentioned, the distance in at least some embodiments may not vary linearly with changes in pressure applied to a pressure sensor. For example, a user might provide more variation at lower or higher pressures, a sensor might be more sensitive at lower or higher pressures, etc. Thus, one or more functions can be used to control the distance with changes in pressure. For example, as illustrated in the plot 260 of FIG. 2D, there can be a linear or exponential function applied to the changes in pressure in order to vary the distance or location of the corresponding object. For example, it might be desirable for small changes to make larger impact at lower pressures than higher pressures, or vice versa. Similarly, in some instances it may be beneficial to utilize a linear function and let the user figure out how to best control the position. In some embodiments, some amount of machine learning can be used to customize the function and relationship between pressure and distance, such that the relationship becomes customized for the preference or capabilities of the user. As mentioned, in some embodiments the pressure will control direction and acceleration or velocity instead of distance, and a similar approach can be taken in those embodiments to use an appropriate function or adjust to user preferences over time.

In some embodiments, the information returned from a pressure sensor can be relatively noisy. Various input mechanisms use sensors or transducers to detect an amount of pressure applied, with a corresponding output signal being generated. Because the pressure data is typically not consistent, some amount of dampening feel can be applied such that an initial movement or acceleration of a virtual object with applied pressure can be relatively slow, but can increase over time. This helps to prevent large jumps in the position of the object due to noise in the pressure data, and enables a user better control at the outset and until an average pressure, or more stable pressure reading over time, can be determined. In some embodiments there might be a maximum movement rate, which may be configurable, up to which the acceleration can be applied. The acceleration thus might be a linear function of pressure, whereby the acceleration starts relatively slowly but increases more with additional pressure. As the user presses near maximum pressure the movement will then accelerate most rapidly, but will accelerate only slightly with slight pressure applications in order to provide finer grained control, in addition to overcoming noise issues. In at least some embodiments, a smoothing function can also be applied to attempt to account for noise in the pressure data returned from the various sensors.

In addition to AR and VR development, such an approach can be used to design any environment where modeling and placement will be performed in a three-dimensional environment, or where objects are to be placed in a three-dimensional environment, even if eventually rendered with a two-dimensional representation. Further, such an approach can be used by a player or viewer of such content as well. For example, a person accessing the AR content can use a headset to rotate, as is typical for AR applications, but can use a pressure sensor to place or position items as well. For example, if a player wants to set an object somewhere, the player can provide the direction through head movement to look at the position, then can utilize the pressure sensor to place the object at the appropriate distance. Such an approach can be used to perform any appropriate action, where the action involves some indication of distance or longitudinal motion that can be controlled at least in part through use of at least one pressure sensor. While certain buttons and analog controllers allow for measured input, these devices do not utilize pressure considerations in their determinations, which can provide for greater control and ease of use for at least some applications, and can be more intuitive for at least some users.

As mentioned, in some embodiments an object can move back towards the virtual camera with a decrease in applied pressure. Such an approach can make it potentially difficult to place items if there is always some amount of back motion when letting off a pressure sensor. Accordingly, approaches in accordance with various embodiments can implement time windows or other functions that analyze the way in which pressure is removed from a sensor. If the applied pressure quickly drops to zero, such as within a specified time threshold of less than 0.25 seconds, then the reduction in pressure can be considered to be a stop action, and no backwards (or further forward) movement of the object will occur as a result. The time threshold can be configurable, and can also be adjusted or learned over time for different users or applications. If a slow decrease in pressure is detected, such as where pressure is still applied after the time threshold, then the action can be interpreted as a deliberate pressure change, and the position of the object can be updated accordingly.

As mentioned, the speed of acceleration, amount of movement, or other adjustments of object (or other content or action) position can be user adjustable. This can be similar to how a user might adjust the speed of a mouse for a conventional desktop computer. The speed or behavior might also be learned by monitoring user behavior over time. For example, if a user has to continually increase pressure then the speed may not be fast enough. Similarly, if a user continually has to let off the pressure and reverse a direction of movement of the object, then the speed might advantageously be decreased. The function applied can also be adjusted to provide greater or lesser responsiveness at lower or higher pressures as discussed herein. In some embodiments the profile can be tied to a user account, such that a pressure sensor behaves similarly for the user even when using different devices.

As mentioned, in many instances a computing device such as a tablet computer might have a built in pressure sensor, or touch sensor with pressure detection capability, that can be utilized. In other embodiments a separate peripheral device, or connectable input device, can be used that provides a pressure-sensitive input. Such a device can be connected through a hardwire connection, such as through a USB or MicroUSB port, or wirelessly using Bluetooth or a Wi-Fi connection, among other such options. In some embodiments a controller might be provided with an AR headset that allows for pressure-based input. In some embodiments the device can expose or utilize an API or other interface that enables the pressure data to be utilized or otherwise consumed by the relevant application.

There can be various situations wherein it may be desirable to render or provide augmented reality (AR) content to viewers through a number of different devices. For example, multiple players might be playing a multiplayer game wherein AR content is displayed to each of the players through a respective computing device. As known for AR content, the view and content displayed on each device can be a function of the location of the device in at least some embodiments, as well as the orientation (or changes in orientation) of the respective device. This enables each device to function as an augmented window on the world, where the augmented content will appear to exist in the real world when viewed through the display of the device, typically laid over a live camera view. The scale, angle, and location of the augmented content can move as appropriate with the change in location and/or orientation of the computing device.

Devices used to access AR content can include any devices capable of rendering and/or displaying AR content, such as may include smart phones, tablet computers, smart glasses or contacts, VR headsets, and the like. In some embodiments the AR content will be rendered over a live camera view captured by the device and displayed on a display screen, such as on a smart phone, but in other embodiments the content may be displayed over an actual view, such as for smart glasses. In various embodiments the devices will have at least some type of position and/or orientation determination mechanism, such as a global positioning system (GPS) sensor or electronic gyroscope, which can enable the view to be determined in such a way as to render the AR content with an appropriate angle, scale, and rotation, etc. Each device can have a respective field of view that corresponds to a specific portion of the scene. For each device, only AR content corresponding to locations within that field of view will be rendered and displayed, at any given time, by a display of that device. In order to determine the angle and scale, as well as the point of reference for the field of view, the location of the device can also be determined. As mentioned, this can be determined using a GPS-based approach, or can use an iBeacon or triangulation-based approach, among others known or used for device location determination. The location information can help to determine the location of each device in the scene.

In order to make the AR content appear to be as realistic as possible, it can be desirable in many situations to further cause the rendered objects to appear to be positioned on, or with respect to, actual surfaces in the scene. This can include, for example, being positioned on a track, field surface, tabletop, or other object or element (physical or virtual) in the gameplay field. Further, it can be desirable that these objects are all of the appropriate scale and location with respect to each other, and that these relationships remain consistent unless intentionally varied within the game or content presentation. In order to provide such functionality, it can be desirable to map, model, or otherwise generate an accurate representation of the gameplay field, so that the content can be rendered appropriately with respect to that representation. While in some instances the field may be a fixed and well-known set of objects that does not change, in other instances the field may not be well known or may be able to vary throughout the game. In such situations, some amount of scene mapping using the relevant devices may be required.

For various AR applications, it can be desirable to locate various surfaces, contours, or objects that can be used as reference points for rendering AR content. For example, various embodiments can attempt to locate surfaces, particularly relatively smooth and horizontal surfaces, that can serve as positioning locations for AR content. As an example, data points determined from the captured image data can be analyzed to determine that there is a horizontal surface represented in the data. In response to detecting such a surface, and in some embodiments ensuring that various criteria are satisfied as may relate to size, angle, or smoothness, etc., a polygon or other geometric shape or construct can be generated. Information (e.g., coordinates) for this geometric construct can be determined on the device, or sent to the device, and used for placing rendered AR content. Sending geometric construct data can require much less bandwidth and memory than a full point cloud for a region, although in some embodiments point clouds can be used as well, or in place of the constructs. The constructs can have position and anchor points, for example, which can be used to define the location and shape of the construct. This relatively lightweight construct, definable using a relatively small set of points, allows for rapid adjustment in relative positioning based upon movement of a respective viewing device. This construct can be used as a reference for rendering AR content. Based at least in part upon the position of the geometric construct, which would typically not actually be displayed on the screen but maintained as data in memory, can be used as a reference to render a character or other AR object or element as an overlay with respect to the live view. As the device displayed the content changes position or orientation, the respective position of the geometric construct will change as well. This change can trigger a corresponding change in the rendering of the AR element, to maintain a consistent scale, position, and angle with respect to the geometric construct.

As mentioned, the location for each device can be determined using an appropriate technology or mechanism, such as GPS, iBeacon, or signal triangulation, among other such options. Movement of the device or changes in orientation can be determined using any of a number of sensors or components of the devices themselves, such as may include an electronic compass, magnetometer, accelerometer, electronic gyroscope, altimeter, and the like. The object and position information can be determined from captured sensor data, where the sensors can include various camera sensors (IR, ambient, stereoscopic), structure light components, ultrasonic sensors, or LIDAR sensors, among others.

While many examples presented herein relate to gaming applications, various other AR applications can take advantage of improved accuracy in positioning of virtual objects and other such actions in a virtual environment as well. For example, in a sporting event such an approach can be used to render information on a track or playing surface. In a store, such information can be used to render pricing or product information, views of persons or characters wearing or using various products, etc. For tourism, such an approach can be used to render information or characters in various locations, in order to provide information about the location or site. Various other approaches can be used as well, in situations where it is desired to render at least some amount of AR content, but the size of the space is too large for any single device to accurately map or determine the position and other distant information.

Figure 3:
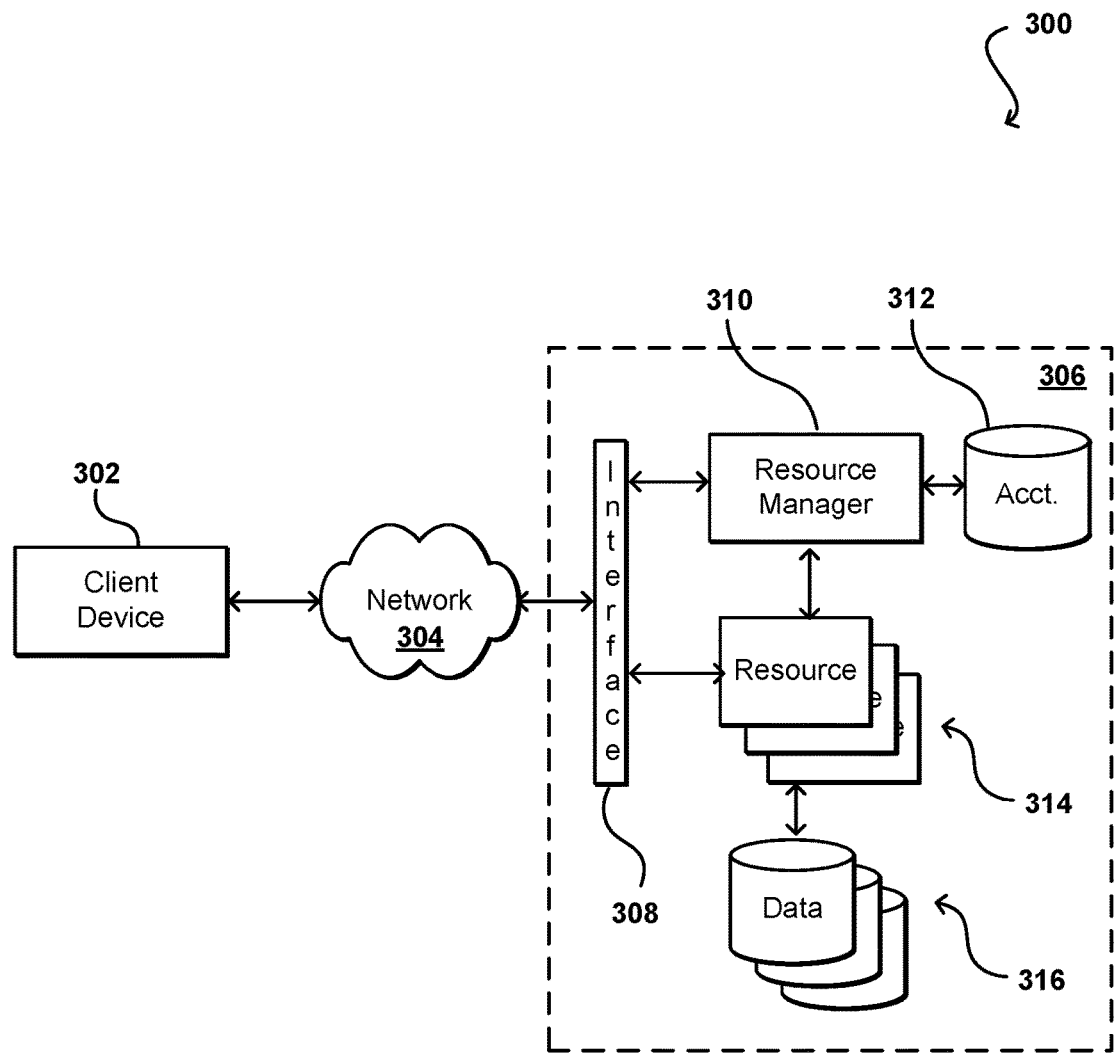
FIG. 3 illustrates an example environment in which various embodiments can be implemented.

FIG. 3 illustrates an example environment 300 in which aspects of the various embodiments can be implemented. In this example a user is able to utilize a client device 302 to submit requests across at least one network 304 to a multi-tenant resource provider environment 306. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 304 can include any appropriate network, including an intranet, the Internet, a cellular network, a local area network (LAN), or any other such network or combination, and communication over the network can be enabled via wired and/or wireless connections. The resource provider environment 306 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 314 of one or more types. These types can include, for example, application servers operable to process instructions provided by a user or database servers operable to process data stored in one or more data stores 316 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 314 can submit a request that is received to an interface layer 308 of the provider environment 306. The interface layer can include application programming interfaces (APIs) or other exposed interfaces enabling a user to submit requests to the provider environment. The interface layer 308 in this example can also include other components as well, such as at least one Web server, routing components, load balancers, and the like. When a request to provision a resource is received to the interface layer 308, information for the request can be directed to a resource manager 310 or other such system, service, or component configured to manage user accounts and information, resource provisioning and usage, and other such aspects. A resource manager 310 receiving the request can perform tasks such as to authenticate an identity of the user submitting the request, as well as to determine whether that user has an existing account with the resource provider, where the account data may be stored in at least one data store 312 in the provider environment. A user can provide any of various types of credentials in order to authenticate an identity of the user to the provider. These credentials can include, for example, a username and password pair, bio-metric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 302 to communicate with an allocated resource without having to communicate with the resource manager 310, at least until such time as a relevant aspect of the user account changes, the user is no longer granted access to the resource, or another such aspect changes.

The resource manager 310 (or another such system or service) in this example can also function as a virtual layer of hardware and software components that handles control functions in addition to management actions, as may include provisioning, scaling, replication, etc. The resource manager can utilize dedicated APIs in the interface layer 308, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 308 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 4:
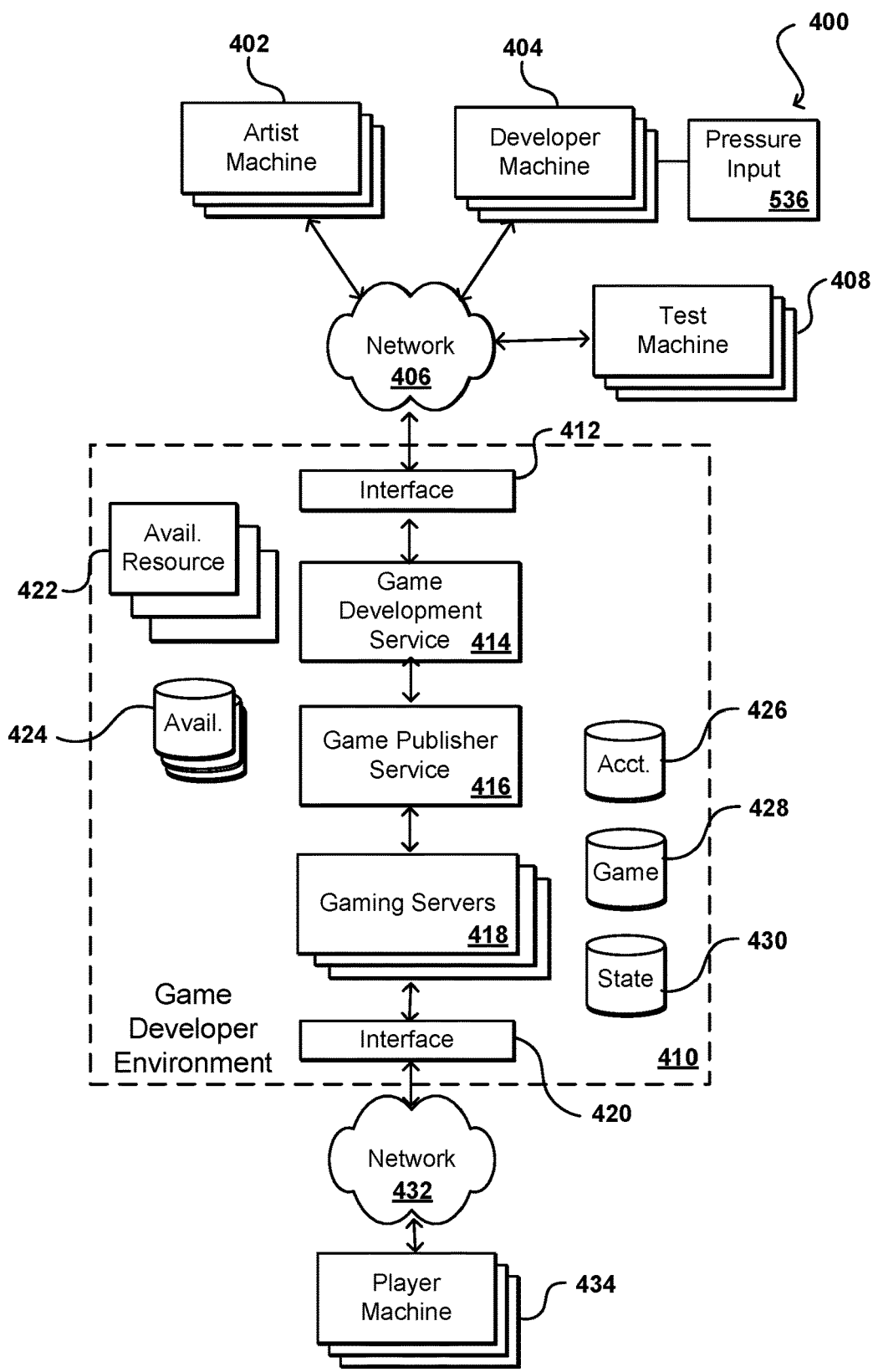
FIG. 4 illustrates an example gaming pipeline that can be used in accordance with various embodiments.

As illustrated in the example system 400 of FIG. 4, at least some of the resources can be used to support platforms and services useful in the development and providing of electronic gaming and three-dimensional graphical content, among other such options. For example, the artist machines 402 and developer machines 404 can collaborate via a game development service 414, which can be provided by a set of resources in a game developer environment 410, or other such resource environment, that are able to scale dynamically as discussed above. It should be understood that artists can fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. Machines such as the developer machines 404 and artist machines 402, as well as the player devices 434 in some embodiments, can utilize a pressure sensor 436, or sensor-inclusive device, for purposes such as those discussed and suggested herein.

The development service can also provide communication services such as messaging and content sharing, among other such options. The game development service can store information for a game to at least one game repository 428, where the repositories can include graphics files, code, audio files, and the like. The game development service 414 can also work with an account manager, or at least maintain information in an account data store 426, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 416. The game publisher service 416 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 404 or otherwise. In some embodiments the game content might be published and made available to one or more test machines 408, which may be associated with the customer, such that the customer can test various builds or versions of the game. In some embodiments feedback provided by the test machines 408 may be provided to the game development service 414, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 418 which can run the game and enable player machines 434 to access the game content over one or more networks 432, which may be different from the network(s) 406 used for game development. This can include, for example, dedicated gaming networks, the Internet, cellular networks, and the like. The player machines 434 can communicate with the appropriate interfaces of an interface layer 420 to obtain the gaming content. In some embodiments the player machines 432 will download the gaming content for execution on the individual machines, and will upload (or otherwise communicate) gaming data, messages, and other information to the gaming servers 418, as well as to other players, social networking sites, or other such recipients. The gaming servers 418 can cause state information for the various instances of the game to be stored to at least one game state repository. This can hold state for the game as a whole or for individual game sessions, among other such options. As mentioned, in some embodiments the devices can send position or image data to a dedicated gaming server 418 or other component in the game developer environment 410, which can be aggregated and analyzed by a surface mapping component, or other such system or process, which can determine authoritative data for use in rendering augmented reality content. The authoritative data can include, for example, point cloud data, geometric primitives, location modeling, and the like. At least some of this data can be provided to the various player devices 434 in order for those devices to render the appropriate AR content for the location and orientation of a given device. In some embodiments the game content can be executed by the game servers and streamed in near real time to the player machines 434. In some embodiments there may alternatively be a mix of gaming content executed on the player machines and the gaming servers. Peer to peer connections among the player machines and other communications can be utilized as well in various embodiments.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

Figure 5:
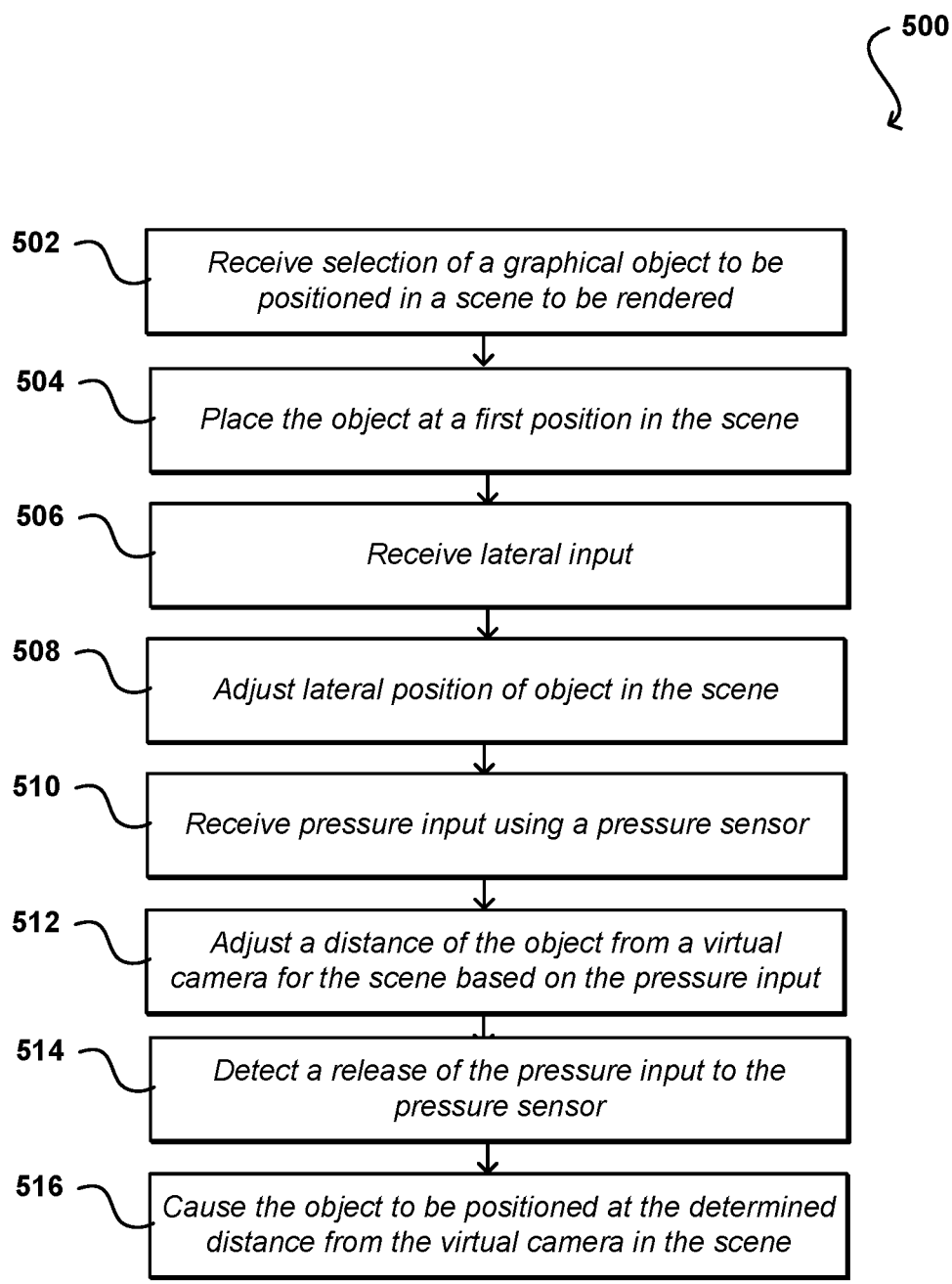
FIG. 5 illustrates an example process for creating augmented reality content that can be utilized in accordance with various embodiments.

FIG. 5 illustrates an example process 500 for controlling a position of objects in an augmented reality environment that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well as discussed and suggested herein. In this example, a user, such as a developer of an augmented reality (AR) application, accesses a user interface of an AR development platform or other such offering. A selection is received 502, through the interface, of a graphical object to be positioned in a scene to be rendered. As mentioned, the scene can relate to a region around a computing device in which augmented reality content, or other dynamically generated content, is to be rendered in such a way that the content appears to be located at a specific physical location with respect to the rendering device. The object can be placed 504 at a first position in the scene, such as at a particular coordinate with respect to a virtual camera used to render a view of the scene. The object can be placed at a default location, or a location where the user indicated to add an object, among other such options. At least some amount of lateral input can be received 506, such as by a user tilting an input device. Such input can cause the object to move laterally, or to the right and/or left with respect to the virtual camera, in the scene. Such input can also allow for rotations and other motions or changes in at least some embodiments. Other types of input can be received as well as would be understood to one of ordinary skill in the art in light of the teachings and suggestions contained herein. The lateral position of the object can then be adjusted 508 in the scene by a direction and/or amount corresponding to the lateral input.

As mentioned, the system can also include at least one pressure sensor for providing input, which might be part of the lateral input mechanism or separate in various embodiments. Pressure input can be received 510 using the pressure sensor, which can include a current pressure reading or data value in at least some embodiments. Changes in the value can be tracked over time, and some amount of smoothing can be applied to account for noise in at least some embodiments. A distance of the virtual object from the virtual camera, or plane of the interface, can be adjusted 512 based at least in part upon the pressure input. As mentioned, a distance, speed, and/or acceleration of the movement can be controlled through the pressure input in at least some embodiments. This can include moving the object in a longitudinal direction to increase and/or decrease the distance between the object and the virtual camera. The longitudinal movements can be combined with lateral movements as well in some embodiments, to provide for concurrent motion in three dimensions. After some amount of movement, a release of the pressure input to the pressure sensor can be detected 514, such as where the pressure input goes to zero in a short period of time less than a threshold period of time, to be counted as a release instead of a pressure decrease. The object can then be caused 516 to be positioned at the determined distance from the virtual camera in the scene. It should be understood, however, that the user can have the option of further lateral and/or longitudinal movements, as well as other adjustments, within the scope of the various embodiments.

Figure 6:
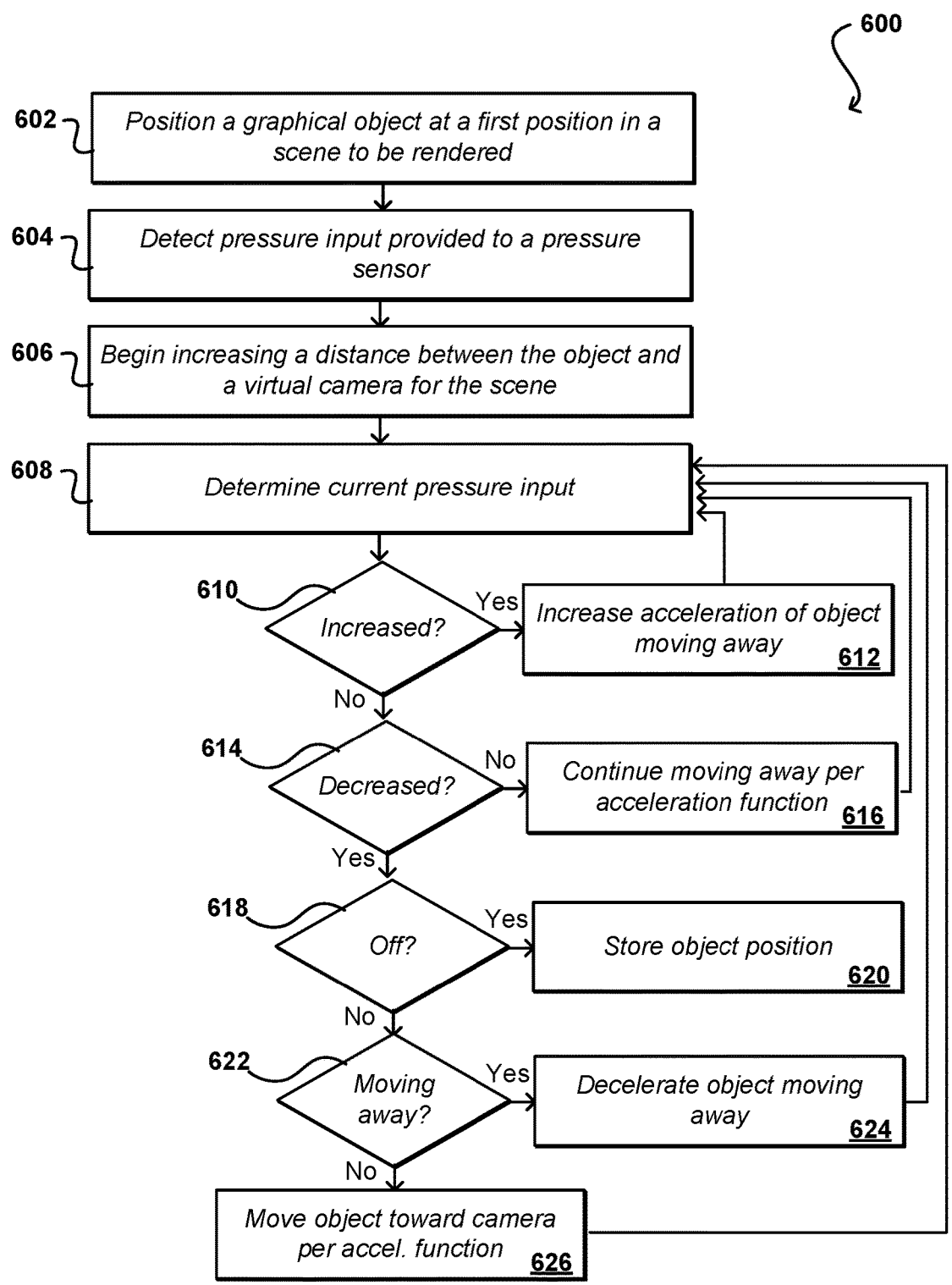
FIG. 6 illustrates an example process for adjusting the position of a virtual object using a pressure sensor that can be utilized in accordance with various embodiments.

FIG. 6 illustrates an example process 600 for controlling the position of an AR object using a pressure sensor that can be utilized in accordance with various embodiments. In this example, a graphical object is positioned 602 at a first position in a scene to be rendered. This can be accomplished using an interface, application, or platform for development, such as discussed with respect to the process of FIG. 5. In this example, pressure input can be detected 604 that is being applied to a pressure sensor of an input mechanism. As discussed, this can be an input on a computing device or an accessory or peripheral device, among other such options. Based at least in part upon the initial application of pressure, a distance between the object and the virtual camera in the scene can begin to be increased 606. As mentioned, in some embodiments the motion will correspond directly to the pressure applied, while in others an acceleration function can be utilized that will control the rate of movement of the object with respect to the amount and change in detected pressure.

Once pressure is being applied, that pressure can be monitored to determine subsequent movements to be made for the virtual object. In this example, the current pressure input can be determined 608, such as a current value received from the sensor. As mentioned, some amount of smoothing or processing may be utilized to reduce noise and jitter in the data in at least some embodiments. If it is determined 610 that the pressure has increased since the last reading, the acceleration of the object moving away from the virtual camera can be increased 612. The distance from the virtual camera will continue to increase, but at a faster rate corresponding to the acceleration function. If it is determined 614 that the pressure reading did not change then the object can continue 616 moving away from the virtual camera per the acceleration function. This can be at a same rate or a different rate, depending upon the function applied. If it is determined 618 that a decrease in pressure corresponds to a removal of the pressure, such as by the pressure reading going to zero within a threshold period of time, the longitudinal motion of the object can stop and the object position can be stored 620 for rendering in the AR (or other) application or environment. If it is determined 622 that the pressure was not removed, but the pressure was decreased and the object is moving away, the movement can be decelerated 624 such that the movement away from the virtual camera occurs at a slower speed, such as where the position is getting close to the desired position and the user wants more control. If the object was not moving away and was either stopped or moving back towards the virtual camera, the decrease in pressure can cause the object to be moved 626 back towards the virtual camera at a rate determined per the acceleration function. As mentioned, the acceleration function can work the same in both directions, or a different function can be applied for each direction, among other such options. The process can continue until the object position is stored due to the removal of pressure from the pressure sensor, or another such stop event or occurrence is detected.

Figure 7:
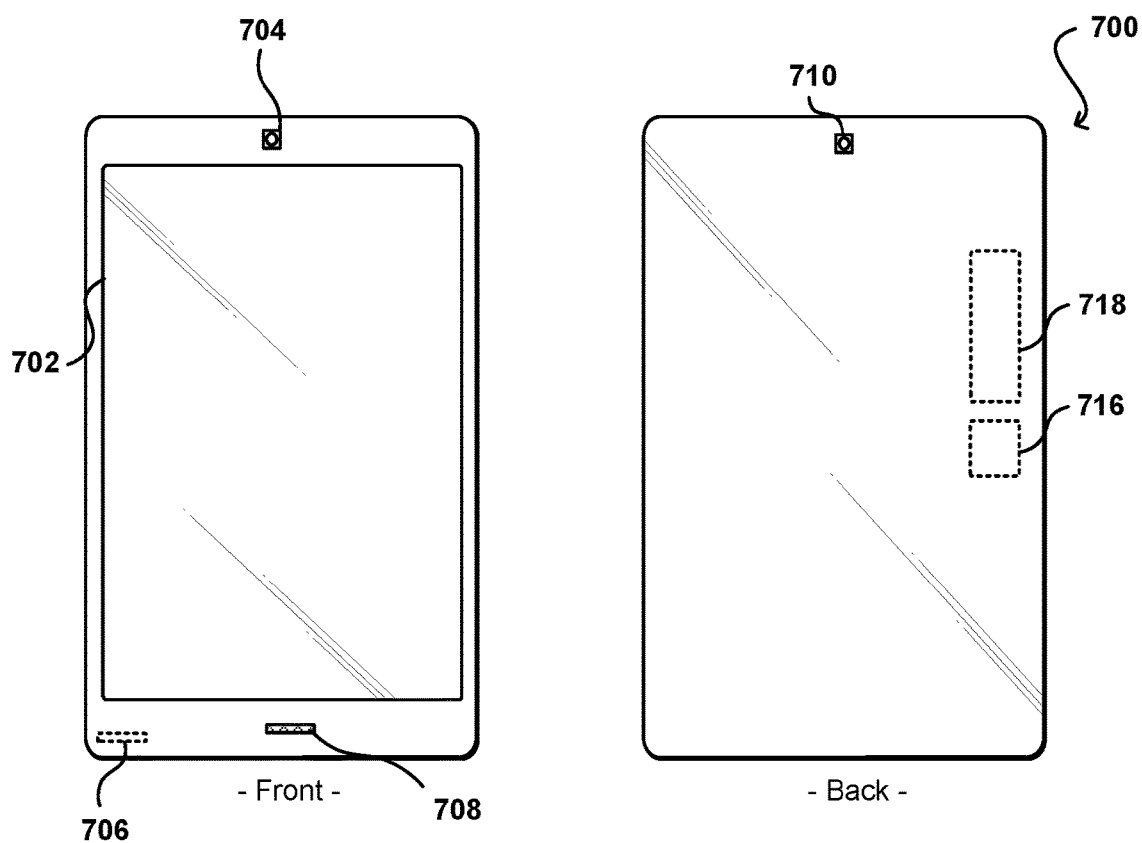
FIG. 7 illustrates an example computing device that can execute a gaming application in accordance with various embodiments.

FIG. 7 illustrates front and back views of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including an image capture element 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display screen of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there is one microphone 708 on the front side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 706, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
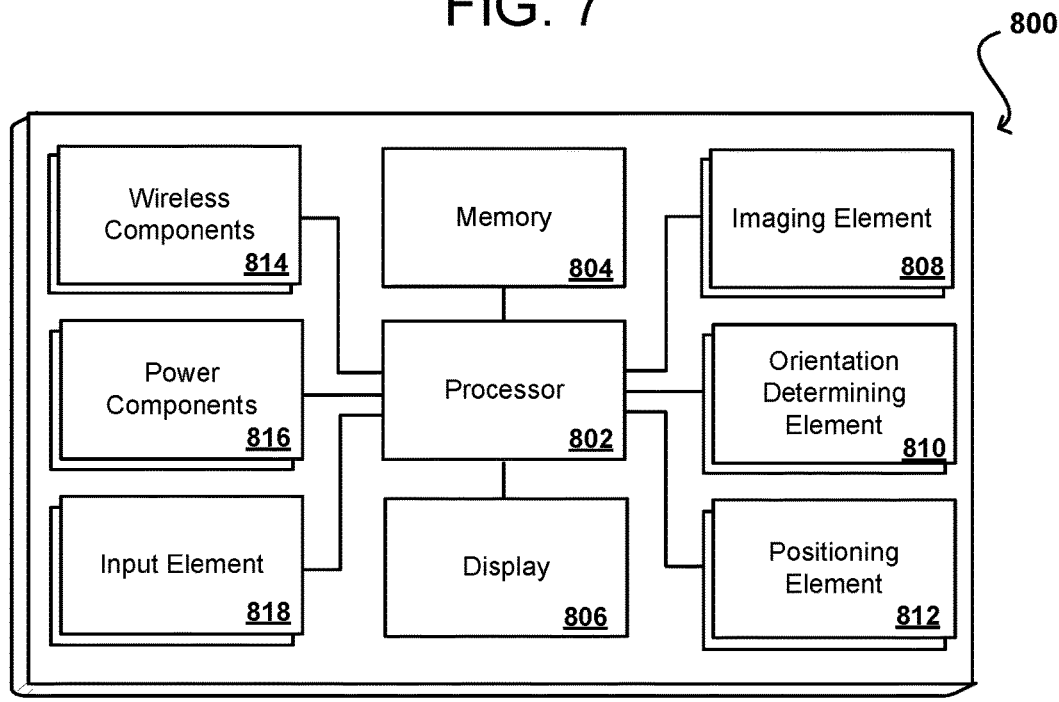
FIG. 8 illustrates example components of a computing device that can be used to implement aspects of the various embodiments.

FIG. 8 illustrates a set of basic components of an electronic computing device 800 such as the device 700 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display screen 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    placing a virtual object in a scene being created through an augmented reality (AR) application, the virtual object being placed a first distance from a virtual camera corresponding to a current point of view of the scene as displayed through the AR application;
    detecting a change in pressure applied to a pressure sensor of an input device;
    moving the virtual object to a second distance from the virtual camera in the scene, the second distance being further from the virtual camera for an increase in pressure, or closer to the virtual camera for a decrease in pressure, by an amount corresponding to the change in pressure;
    detecting pressure being released from the pressure sensor of the input device; and
    causing the virtual object to be placed in the scene at a position corresponding to the second distance at which the pressure was released from the pressure sensor.

2. The computer-implemented method of claim 1, further comprising:
    slowing a rate of movement of the virtual object away from the virtual camera, in response to the decrease in pressure, before decreasing the distance between the virtual object and the virtual camera.

3. The computer-implemented method of claim 1, further comprising:
    adjusting an acceleration of a change in distance between the virtual object and the virtual camera in the scene based at least in part upon the change in pressure detected by the pressure sensor.

4. The computer-implemented method of claim 1, further comprising:
    detecting the pressure being released by detecting a pressure reading of the pressure sensor going to zero in under a threshold period of time; and
    causing the virtual object to be placed in the scene at a position corresponding to the second distance without a movement back toward the virtual camera corresponding to the decrease in pressure applied to the pressure sensor.

5. A computer-implemented method, comprising:
    rendering, from a point of view of a virtual camera, a first view of a virtual object in a three-dimensional scene;
    detecting a change in pressure applied to a pressure sensor of an input device;
    adjusting a distance between the virtual object and the virtual camera corresponding to the change in pressure by moving the virtual object further from the virtual camera for an increase in pressure, or closer to the virtual camera for the decrease in pressure; and
    rendering a second view of the virtual object in the three-dimensional scene at the adjusted distance from the virtual camera.

6. The computer-implemented method of claim 5, further comprising:
    determining a rate of acceleration to use for the adjusting of the distance using at least one acceleration function selected for an augmented reality (AR) application for rendering the scene.

7. The computer-implemented method of claim 6, further comprising:
    adjusting the rate of acceleration in part based upon detected changes in the pressure applied to the pressure sensor, wherein a decrease in pressure causes movement of the virtual object away from the virtual camera to decrease before the virtual object begins moving back towards the virtual camera.

8. The computer-implemented method of claim 5, wherein the rate of acceleration is adjustable based upon at least one of user preference input or learned user behavior.

9. The computer-implemented method of claim 5, further comprising:
    detecting additional input through at least one development tool; and
    adjusting at least one of a lateral position or rotation of the virtual object based at least in part upon the additional input.

10. The computer-implemented method of claim 5, further comprising:
    detecting the pressure being released from the pressure sensor by detecting a pressure reading of the pressure sensor going to zero in under a threshold period of time; and
    causing the virtual object to be placed in the scene at a position corresponding to the adjusted distance without a movement back toward the virtual camera corresponding to the decrease in pressure applied to the pressure sensor.

11. The computer-implemented method of claim 10, further comprising:
    causing an augmented reality (AR) application, executing on a client device, to capture video data for a live camera view; and
    causing the AR application to render the virtual object at the position corresponding to the adjusted distance when the position is within a field of view of a camera of the client device.

12. The computer-implemented method of claim 5, further comprising:
    determining a rate for adjusting the distance based at least in part upon a relationship of the amount of possible distance change in the scene with an amount of possible pressure application to the pressure sensor.

13. The computer-implemented method of claim 5, further comprising:
    analyzing pressure data, received from the pressure sensor, over a sliding window of time; and
    applying a smoothing function to the pressure data to reduce an amount of noise reflected in the pressure data.

14. A system, comprising:
    a display device;
    an input device including a pressure sensor;
    at least one processor; and
    memory including instructions that, when executed by the at least one processor, cause the system to:
        render, for display on the display device, a first view of a virtual object in a three-dimensional scene, the first view corresponding to a point of view of a virtual camera;
        detect, by the input device, a change in pressure applied to the pressure sensor;
        adjust a distance between the virtual camera and the virtual object based upon the change in pressure by moving the virtual object further from the virtual camera for an increase in pressure, or closer to the virtual camera for the decrease in pressure; and
        render, for display on the display device, a second view of the virtual object in the three-dimensional scene at the distance from the virtual camera.

15. The system of claim 14, wherein the instructions when executed further cause the system to:
    determine a rate of acceleration to use for the adjusting of the distance using at least one acceleration function selected for an augmented reality (AR) application for rendering the scene; and
    adjust the rate of acceleration in part based upon detected changes in the pressure applied to the pressure sensor, wherein a decrease in pressure causes movement of the virtual object away from the virtual camera to decrease before the virtual object begins moving back towards the virtual camera.

16. The system of claim 14, wherein the instructions when executed further cause the system to:
    detect additional input through at least one development tool; and
    adjust at least one of a lateral position or rotation of the virtual object based at least in part upon the additional input.

17. The system of claim 14, wherein the instructions when executed further cause the system to:
    detect the pressure being released from the pressure sensor by detecting a pressure reading of the pressure sensor going to zero in under a threshold period of time; and
    cause the virtual object to be placed in the scene at a position corresponding to the adjusted distance without a movement back toward the virtual camera corresponding to the decrease in pressure applied to the pressure sensor.

18. The system of claim 14, wherein the instructions when executed further cause the system to:
    cause an augmented reality (AR) application, executing on a client device, to capture video data for a live camera view; and
    cause the AR application to render the virtual object at the position corresponding to the adjusted distance when the position is within a field of view of a camera of the client device.

19. The system of claim 14, wherein the instructions when executed further cause the system to:
    analyze pressure data, received from the pressure sensor, over a sliding window of time; and
    apply a smoothing function to the pressure data to reduce an amount of noise reflected in the pressure data.

* * * * *